April 23, 1968 E. F. KELLEY ET AL 3,379,143
AUTOMATIC CORN PRESS
Original Filed Feb. 10, 1964 5 Sheets-Sheet 1
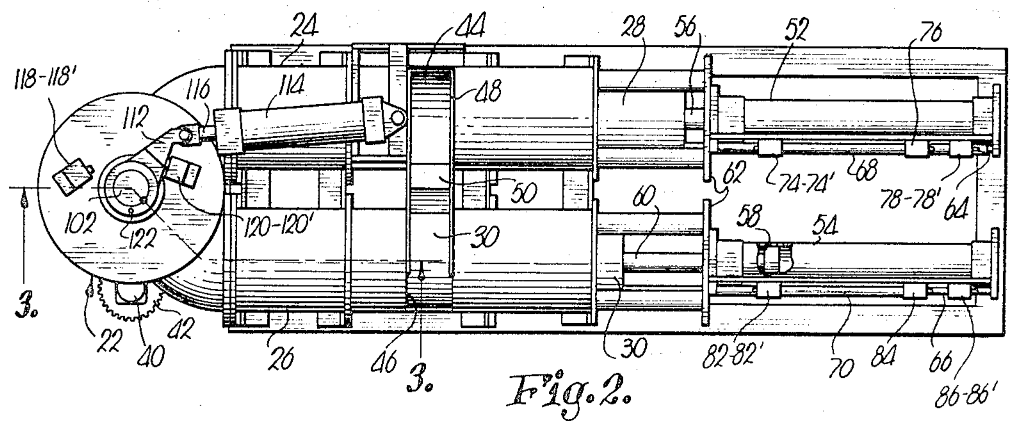
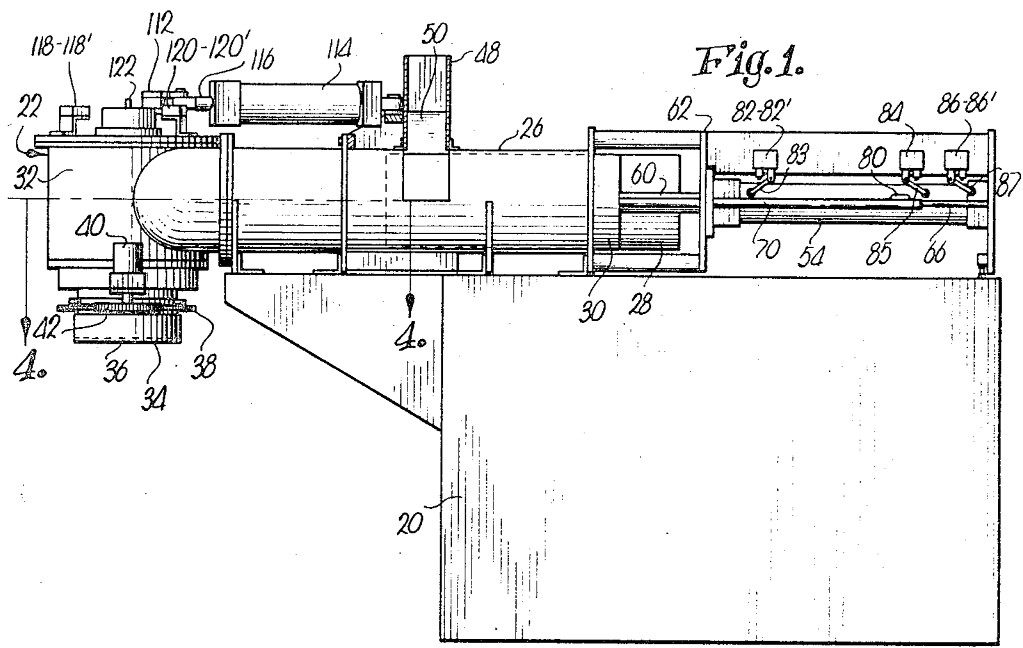
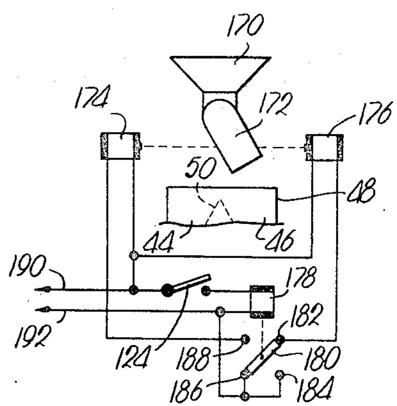
INVENTORS.
Edwin F. Kelley
BY Frank J. Thomas
Hovey, Schmidt, Johnson & Hovey
ATTORNEYS.

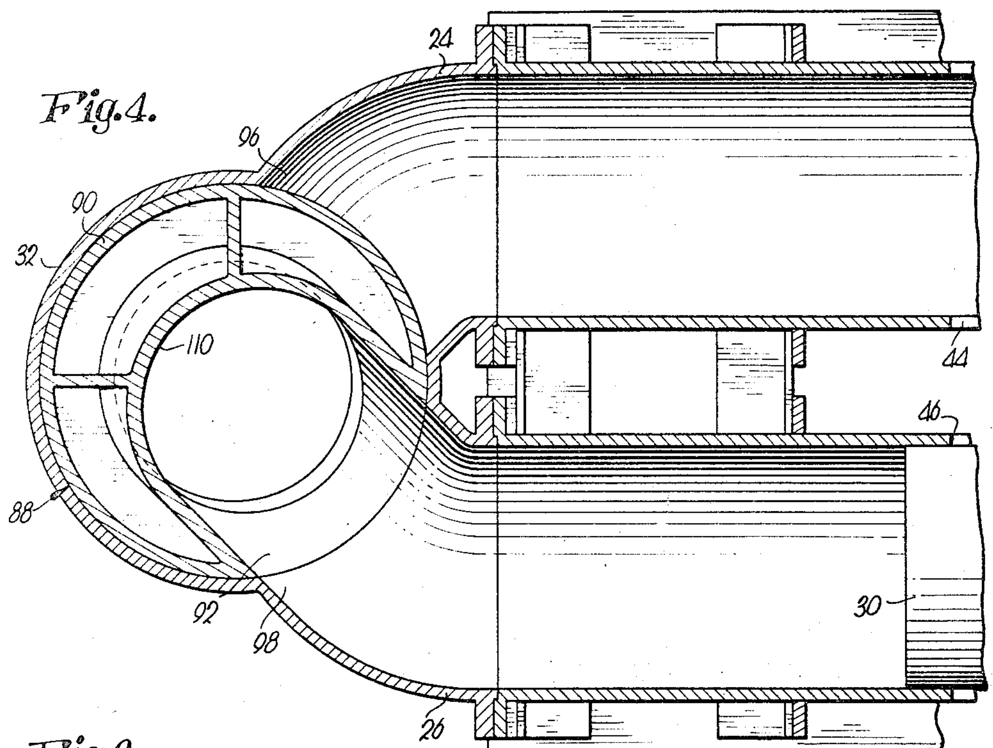
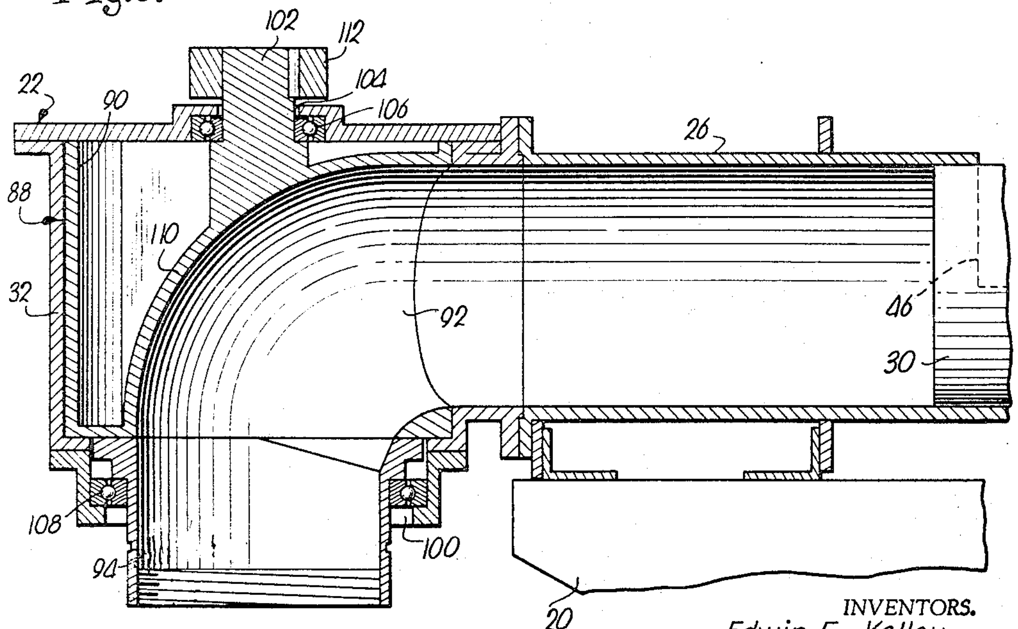
INVENTORS.
Edwin F. Kelley
Frank J. Thomas
BY
Hovey, Schmidt, Johnson & Hovey
ATTORNEYS.

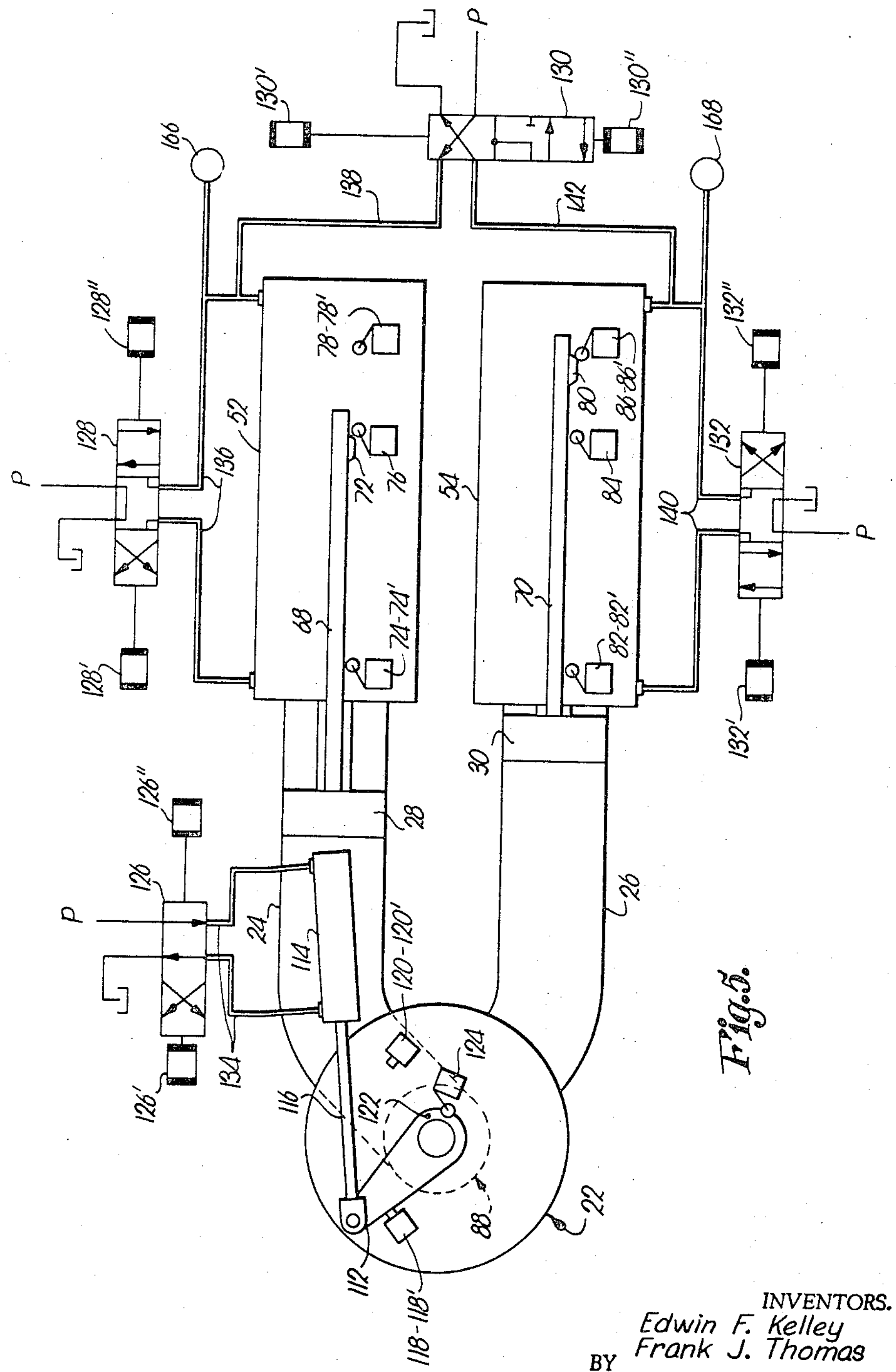
INVENTORS.
Edwin F. Kelley
Frank J. Thomas
BY
Hovey, Schmidt, Johnson & Hovey
ATTORNEYS.

INVENTORS.
Edwin F. Kelley
BY Frank J. Thomas

Hovey, Schmidt, Johnson & Hovey
ATTORNEYS.

INVENTORS.
Edwin F. Kelley
Frank J. Thomas
BY
Hovey, Schmidt, Johnson & Hovey.
ATTORNEYS.

United States Patent Office 3,379,143

Patented Apr. 23, 1968

3,379,143
AUTOMATIC CORN PRESS

Edwin F. Kelley, Kansas City, Mo., and Frank J. Thomas, Overland Park, Kans., assignors, by mesne assignments, to Manley, Inc., Kansas City, Mo., a corporation of Missouri Original application Feb. 10, 1964, Ser. No. 343,608. Divided and this application Nov. 29, 1966, Ser. No. 610,702

20 Claims. (Cl. 107—14)

ABSTRACT OF THE DISCLOSURE

A pair of material-feeding tubes are associated with an extrusion head, each tube having a material inlet spaced from the head for receiving dough which is ultimately forced into the head and extruded therefrom. A rotary valve is utilized to alternately communicate the tubes with the head to provide continuous extrusion. A reciprocating ram is disposed in each tube for loading the latter and forcing the loaded dough into the head. Loading is effected in a particular tube by reciprocating the ram thereof across the inlet to progressively load the tube a wad at a time until a mass of dough is accumulated, whereupon a continuous forward stroke of the ram commences to pack the dough against the closed valve, the latter being open to the other tube at this time which is in its extrusion phase. After packing, the valve is shifted to open that tube to the head and the ram thereof is then driven under high pressure to extrude the packed dough, during which time the other ram is caused to undergo its loading phase.

This is a division of our co-pending application Ser. No. 343,608, filed Feb. 10, 1964, and entitled, "Automatic Corn Press" (now abandoned).

This invention relates generally to extruding machines and, more specifically, to improvements in apparatus for extruding dough or similar substances.

The apparatus to be described hereinafter is used primarily in the process of manufacturing corn chips by forcing a prepared dough through an extrusion die. In order to obtain maximum efficiency and output from the extruder, it is requisite that the extrusion head be continuously fed with the material to be extruded. Furthermore, especially when dough or similar substances are to be extruded, it is also necessary that the material be packed to the desired density to form a homogeneous batch or body prior to extrusion.

It is, therefore, the primary object of this invention to provide means for continuously feeding an extrusion head with packed dough or similar substances to be extruded.

It is another object of this invention to provide a pair of material feeders for an extrusion head, one of the feeders being employed to load the material while the other feeder drives loaded material into the head and to provide means for alternating operation of the feeders so that continuous loading and extruding will be effected.

It is another object of this invention to provide a machine for progressively accumulating material to be extruded, compressing the accumulated material to pack it into a composite mass, and gradually pressing the packed mass into an extrusion head.

Another object of this invention is to provide a feeder tube and ram for an extrusion head that will progressively load the tube with material to be extruded and then transfer the loaded material into the head.

Still another object of this invention is to provide a feeder tube and ram as aforesaid in combination with a valve for the tube which blocks flow of material into the head during loading of the material, permitting packing of the loaded material against the valve by the ram prior to transfer thereof into the head upon opening of the valve.

Yet another object of this invention is to provide apparatus as set forth in the last-mentioned object that will increase the force exerted on the material after packing to a higher level for transfer of the material into the head.

It is still another object of this invention to provide a rotary valve for an extrusion head for use in alternately communicating material feeders with the head, and which permits packing of material against the valve by the feeder that the valve is blocking.

Other objects will become apparent as the detailed description proceeds.

In the drawings:

FIGURE 1 is a side elevational view of the apparatus of the instant invention;

FIG. 2 is a top plan view of the apparatus;

FIG. 3 is an irregular, sectional view taken along line 3—3 of FIG. 2 showing the rotary valve of the instant invention with the extrusion die removed from the extrusion head;

FIG. 4 is a sectional view taken along line 4—4 of FIG. 1;

FIG. 5 is a diagrammatic representation of the apparatus showing the hydraulic cylinders, hydraulic valves, and the limit switches and pressure sensitive switches employed by the control circuitry;

FIG. 11 is a diagrammatic and schematic representation of means for alternately feeding the two tubes with material to be extruded.

*Mechanical components of the extruder*

Figure 6:
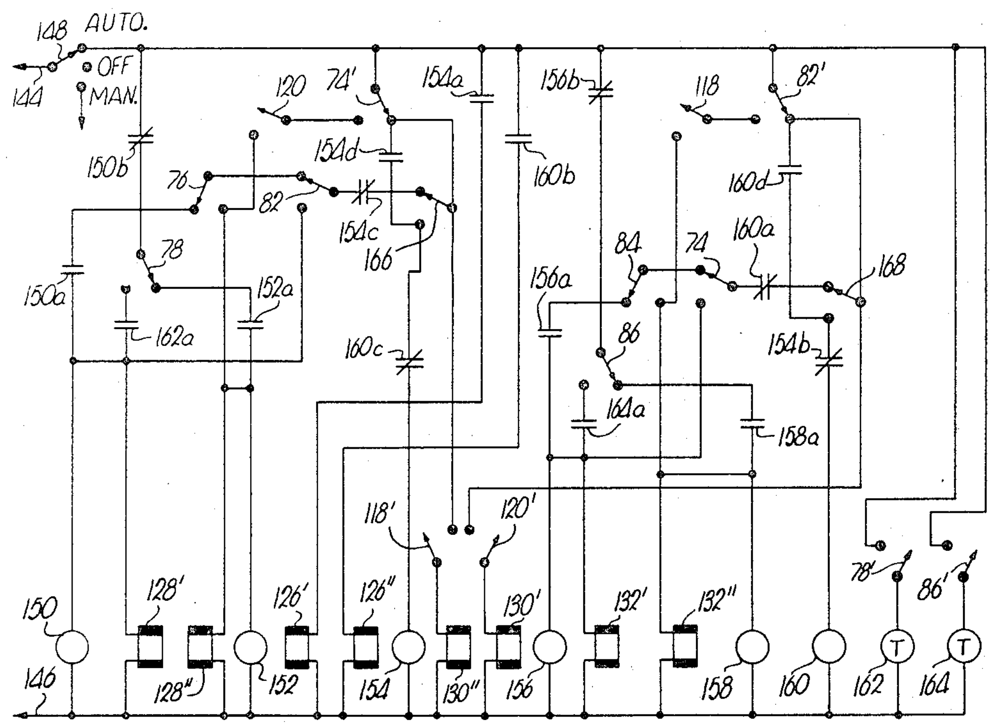
FIG. 6 is an electrical schematic diagram of the control circuitry showing all components thereof de-energized and deactivated.

Referring particularly to FIGS. 1, 2 and 5, the reference numeral 20 designates a housing containing the power supplies and control circuitry for the extrusion machine. The machine proper is mounted on housing 20 and comprises an extrusion head 22 and a pair of tubes 24 and 26 communicated with the head. Tubes 24 and 26 have a pair of reciprocable rams 28 and 30, respectively, disposed therein. (It should be understood that the dispositions of the rams 28 and 30 shown in the diagrammatic representation of FIG. 5 are not the same as the positions of the rams illustrated in the elevational views of FIGS. 1 and 2.)

The head 22 includes a generally cylindrical, hollow body 32 and an extrusion die 34. Material is extruded from the head through a series of circumferentially spaced slots 36 in the die. A ring gear 38 is coupled with a knife (not shown) which cuts the extruded ribbons into predetermined lengths. Ring gear 38 is driven by a motor 40 operably coupled with a pinion 42, the latter being engaged with ring gear 38.

Tubes 24 and 26 have inlet ports 44 and 46 therein, respectively, which receive the material to be extruded from a hopper 48. Hopper 48 has therewithin a partition 50 which is inclined from its center toward the ports 44 and 46 so that material may be alternately directed to the ports in a manner to be hereinafter described.

Tubes 24 and 26 have associated therewith hydraulic cylinders 52 and 54 respectively. Cylinder 52 is coupled with ram 28 in tube 24 by a piston (not shown) and piston rod 56. The ram 30 in tube 26 is coupled with cylinder 54 by a piston 58 in cylinder 54 and its piston rod 60. It should be appreciated that the rams slide within their tubes, the outer surfaces of the rams being mated with the inner surfaces of the tubes so that the inlet ports 44 and 46 are sealed when the rams are in underlying relationship thereto.

Support structures 62 rigidly mount a pair of rods or guides 64 and 66 in alignment with rams 28 and 30 respectively. Rams 28 and 30 carry sleeves or tubular, cam-bearing members 68 and 70 respectively. The members 68 and 70 slidably receive guides 64 and 66. Member 68 carries a cam 72 which is operably associated with limit switches 74–74′, 76, 78–78′. Similarly, member 70 carries a cam 80 which is operably associated with limit switches 82–82′, 84, and 86–86′.

With reference now to FIGS. 1–5, it may be seen that body 32 of extrusion head 22 has therewithin a rotary valve 88. Valve 88 comprises a generally cylindrical housing 90 having an entrance 92 in the side of the housing, and an exit 94 in the base of the housing. Body 32 has a pair of inlets 96 and 98 in the side thereof registered with the ends of tubes 24 and 26, respectively, and an outlet 100 in the base of the body. A vertical shaft 102 is rigid with valve 88, such shaft extending through an opening 104 in the top of body 32 and being journalled on the body by bearing assembly 106. A bearing assembly 108 journals the lower portion of housing 90 for rotation within the outlet 100 in the base of body 32.

It may be appreciated that rotation of shaft 102 rotates valve 88 about a vertical axis through the shaft and swings entrance 92 so that the entrance may be aligned with inlet 96 or inlet 98. This permits passage of material from one of the tubes 24 or 26 through the valve and onto extrusion die 34 through outlet 100 by way of exit 94. Entrance 92 and exit 94 are communicated by a longitudinally curved, tubular member in the form of a 90° elbow 110 which defines a passage for flow of material from the entrance to the exit.

A crank arm 112 is coupled with shaft 102 and is actuatable by a hydraulic piston and cylinder assembly 114. Piston stem 116 interconnects the end of crank arm 112 remote from shaft 102 with assembly 114. Limit switches 118–118′ and 120–120′ are disposed for actuation by crank arm 112 at the ends of its path of travel. It may be noted that a vertically extending pin 122 is disposed on the crank arm in spaced relationship to the axis of rotation thereof, pin 122 being engageable with a limit switch 124 for actuating the latter midway in the path of travel of the crank arm. (Switch 124 may be seen in FIGS. 5 and 11).

*Hydraulic system and electric control circuitry*

Referring to FIGS. 5–10 it may be seen that the hydraulic controls for the extruder comprise hydraulic valves 126, 128, 130 and 132. Valve 126 is controlled by solenoids 126′ and 126″ coupled therewith. Valve 128 is spring-biased into the neutral position shown in FIG. 5 and is operably coupled with a pair of solenoids 128′ and 128″, such solenoids being employed to move valve 128 to its operative positions. In similar fashion, valve 130 is controlled by solenoids 130′ and 130″ and valve 132 is operated by solenoids 132′ and 132″. Both valves 130 and 132 are spring-biased so as to be normally maintained in the neutral position, valve 132 being shown in FIG. 5 in such neutral position, while valve 130 is illustrated in its operative position corresponding to energization of solenoid 130″.

Hydraulic lines 134 operably couple piston and cylinder assembly 114 with valve 128, actuation of solenoids 126′ or 126″ effecting movement of valve 126 to, in turn, cause longitudinal shifting of piston stem 116. Piston stem 116 is shown in its extended position corresponding to energization of solenoid 126′, at which time crank arm 112 is operably engaged with limit switch 118–118′ to effect communication of valve 88 with tube 24. This is illustrated in FIG. 5 and is the positions of these components when material is being extruded from tube 24 by ram 28 and hence passed through the valve to the extrusion die. It should be appreciated that energization of solenoid 126″ will swing crank arm 112 until the same engages limit switch 120–120′, this position corresponding to extrusion by ram 30.

Valve 128 is coupled with cylinder 52 by hydraulic lines 136. In the FIG. 5 illustration this valve is inoperative for reasons to be fully explained hereinafter. Valve 130 is coupled with cylinder 52 by hydraulic line 138, valve 130 being schematically illustrated as disposed to permit passage of fluid from the pressure side or fluid source to cylinder 52. This effects driving of ram 28 to extrude material from tube 24.

Ram 30 in tube 26 is shown in FIG. 5 at rest during loading of material into tube 26. The loading operation will be described fully hereinafter, it being sufficient at this juncture to note that valve 132 is coupled with cylinder 54 by hydraulic lines 140 and valve 130 is coupled with cylinder 54 by hydraulic line 142. The hydraulic fluid for operating the cylinders 52, 54 and 114 may be supplied by any suitable source, the design and constructional details thereof being widely known and understood in the art. For this reason, the hydraulic system in its entirety is not shown in the drawings. It should be understood, however, that it is desired to supply valve 130 with fluid under a relatively high pressure since this valve controls fluid flow into cylinders 52 and 54 during the extrusion phases of the rams when high driving power is required. On the other hand, lower fluid pressures are preferred for valves 126, 128, and 132.

The circuitry for controlling the energization of the various hydraulic valve solenoids is shown in FIGS. 6–10. The limit switches associated with the rams and the valve are there illustrated in schematic form. It should be understood that limit switches designated by a single reference character are single-pole switches, while those limit switches designated earlier in this specification by double reference characters (an unprimed and a primed notation) are double-pole switches. Therefore, these latter limit switches are actually two switches in one responsive to a single actuator arm.

Referring momentarily to FIG. 1, it may be noted that an actuator arm 83 is operably coupled with limit switch 82–82′, the limit switches 84 and 86–86′ being provided with actuator arms 85 and 87 respectively. These actuator arms 83, 85 and 87 are responsive to engagement by cam 80 as member 70 slides along guide 66 during movement of ram 30. When cam 80 strikes one of these actuator arms the corresponding limit switch is moved from its normal position to its operated position for the period of time that the cam remains in engagement with the arm. Similarly, cam 72 controls the operational state of limit switches 74–74′, 76, 78–78′ associated with ram 28, and crank arm 112 controls the operational state of limit switches 118–118′ and 120–120′. The operation of limit switches such as these being well-known and used in the art, further explanation in this specification is unnecessary, it being understood that these limit switches control the operation of valve 88 and rams 28 and 30 through the use of control circuitry to be fully described in the paragraphs to follow.

In FIG. 6 the various limit switches aforesaid are shown in their normal states prior to actuation thereof. It may be noted that the solenoids for controlling the hydraulic valves appear in FIG. 6, the solenoids being operably coupled with the limit switches by a system of relays and switching circuitry. It should be understood that the relay coils of the relays are designated by numerical reference characters, each switch responsive to a given relay coil being designated by a numerical reference character identical to the numeral used for the coil but followed by the letter *a*, *b*, *c* or *d*. This system of notation for the relay coils and switches responsive thereto will become clear in the paragraphs to follow.

Lines 144 and 146 represent connection points for a suitable source of electrical power. A single-pole, three-position switch 148 is manually operable and selects the operational state of the circuitry. When the switch is in the position shown, the circuitry is coupled with the power source and renders the extruder responsive to automatic control by the circuitry. The "manual" position provides a connection for push button switches (not shown) which may be added to the circuitry to provide manual override of the automatic functions for use during starting of the machine, cleaning thereof, etc.

In FIG. 6 it may be seen that the circuitry comprises relay coils 150, 152, 154, 156, 158 and 160. All of these relay coils have one electrical side thereof connected with line 146. Coil 150 has associated therewith a normally open switch **150*a* and a normally closed switch 150*b*. Coil 152 has associated therewith a normally open switch 152*a*. Relay coil 154 is operably coupled with a normally open switch 154*a*, a normally closed switch 154*b*, a normally closed switch 154*c*, and a normally open switch 154*d*. Coil 156 is coupled with a normally open switch 156*a* and a normally closed switch 156*b*. Coil 158 has a normally open switch 158*a* responsive thereto. Coil 160 is operably associated with a normally closed switch 160*a*, a normally open switch 160*b*, a normally closed switch 160*c*, and a normally open switch 160*d***.

The control circuitry also includes a pair of timers 162 and 164. Timer 162 is operably coupled with a normally open switch **162*a* and timer 164 is operably coupled with a normally open switch 164*a***. It should be understood that each timer and its associated switch may be a unit such as a time-delay relay or an electronic timer device. Each timer operates to close its associated switch a preset period of time subsequent to energization of the timer and maintains the switch in the closed position as long as the timer remains energized.

The control circuitry also employs a pair of pressure-sensitive, single-pole double-throw switches 166 and 168. In FIG. 5 it may be seen that these switches 166 and 168 are coupled, respectively, with hydraulic lines 136 and 140. Each of the switches is actuatable by a predetermined amount of pressure in the corresponding hydraulic line and is shown in FIG. 6 in the position corresponding to fluid pressures less than this predetermined amount. When the predetermined pressure is reached, the switch moves to its other position until such time as the pressure subsides.

In FIG. 11 apparatus for alternately feeding the inlet ports 44 and 46 of tubes 24 and 26 with material to be extended is shown in diagrammatic form. A collector 170 disposed above hopper 48 receives the material and transmits the same to a rotatable pipe or chute 172. A pair of solenoids 174 and 176 is operably coupled with chute 172 for moving the latter from the position shown, in which the chute directs material into port 46, to a position where the chute directs material into port 44.

A stepper relay 178 operates a rotary switch element 180 which engages any diametrically opposed pair of contacts 182, 184, 186 and 188. Lines 190 and 192 supply relay 178 with electrical power through limit switch 124 interposed in series with line 190.

It may be remembered that a pin 122 extending from crank arm 112 actuates limit switch 124 momentarily midway in the path of travel of crank arm 112 between limit switches 118–118′ and 120–120′. This momentary closing of switch 124 energizes relay 178 to rotate element 180 to the next position. Successive momentary energization of relay 178 thus effects continual rotation of element 180 step-by-step to alternately energize solenoids 174 and 176.

*Operation*

Before a detailed discussion of the operation of the instant invention is undertaken, it is instructive to first become familiar with the scheme of operation in a general sense and with the particular process being carried into effect by the apparatus of this invention.

The two tubes 24 and 26 are provided so that continuous feeding of material into the extrusion head will be effected. To this end, while one ram is forcing material down its tube, through the rotary valve, and thence into the extrusion die, the other ram is reciprocated in its tube between defined limits across the corresponding inlet port to load material into the tube. Thus, in essence, the operation of the invention comprises forcibly feeding material accumulated in one tube into the extrusion head while material is being accumulated in the other tube for subsequent extrusion.

The foregoing may be readily appreciated by viewing FIG. 5. In this figure, as explained above, ram 28 is shown at the commencement of its extrusion phase while ram 30 is shown at rest during loading of tube 26. Looking first for the moment at tube 24 and ram 28 only, it may be seen that cam 72 associated with ram 28 is just to the left of limit switch 76. Ram 28 will continue movement longitudinally of tube 24 and leftwardly as viewed in the figure until cam 72 strikes limit switch 74–74′.

Looking now at the operation of ram 30 during the aforesaid extrusion phase of ram 28, it may be seen that cam 80 associated with ram 30 will strike limit switch 84 when the ram commences movement toward the extrusion head. Switch 84, through its associated control circuitry, halts the forward movement of ram 30 when cam 80 strikes the switch and effects retracting movement of the ram back toward limit switch 86–86′. Thus, limit switches 84 and 86–86′ define the limits of reciprocation of ram 30 and cause the ram to follow a path of travel back and forth across inlet port 46 (the inlet ports are not seen in the diagrammatic representation of FIG. 5).

It may readily be appreciated that the movement of ram 30 back and forth across the inlet port will push wads of dough or other material to be extruded toward the extrusion head a short distance during advancement of the ram, and that during retraction thereof, a predetermined quantity of dough will be permitted to flow into the tube in front of the ram for subsequent forward movement when the ram is next advanced. To facilitate this action, the reciprocating ram 30 dwells or momentarily stalls when its cam 80 strikes limit switch 86–86′ to permit flow of dough into the tube.

By the time the extruding ram 28 has reached its forwardmost position, the reciprocating ram 30 has loaded a number of wads of dough into the tube to form a dough batch for subsequent extrusion. When the cam 72 of ram 28 strikes limit switch 74–74′ the control circuitry effects forward movement of ram 30 toward the head past limit switch 84 to pack the batch into a composite mass. Thus, limit switch 84 is rendered ineffective by the control circuitry and will not stop ram 30, permitting the ram to execute the packing function.

It is evident that the packed batch of dough in tube 26 will increase the resistance to the movement of ram 30 toward the head. This increase in resistance is reflected in the hydraulic system; hence, pressure sensitive switch 168 will be actuated when the pressure within the packed, composite mass of dough reaches a predetermined value. Actuation of the pressure sensitive switch momentarily halts further forward movement of ram 30 and, through associated circuitry, actuates piston and cylinder assembly 114 to rotate valve 88 into alignment with tube 26. When the valve becomes aligned with tube 26 it strikes limit switch 120–120′ and commands ram 30 to begin the extrusion phase while ram 28 is retracted to commence reciprocation and loading of its tube with dough. Therefore, the mass of dough that was packed against the valve by ram 30 is now forced into the extrusion head.

A complete cycle of operation will now be described in detail. As stated previously, FIG. 6 shows the various electrical components in their de-energized or inactivated states. It will be assumed initially in this discussion that ram 28 is extruding and that ram 30 is just commencing forward movement during its loading phase. This initial set of conditions is shown in FIGS. 5 and 7 wherein FIG. 5 shows the relative locations of the rams and the positions of the hydraulic valves, and FIG. 7 shows the positions of the various switching devices.

Figure 7:
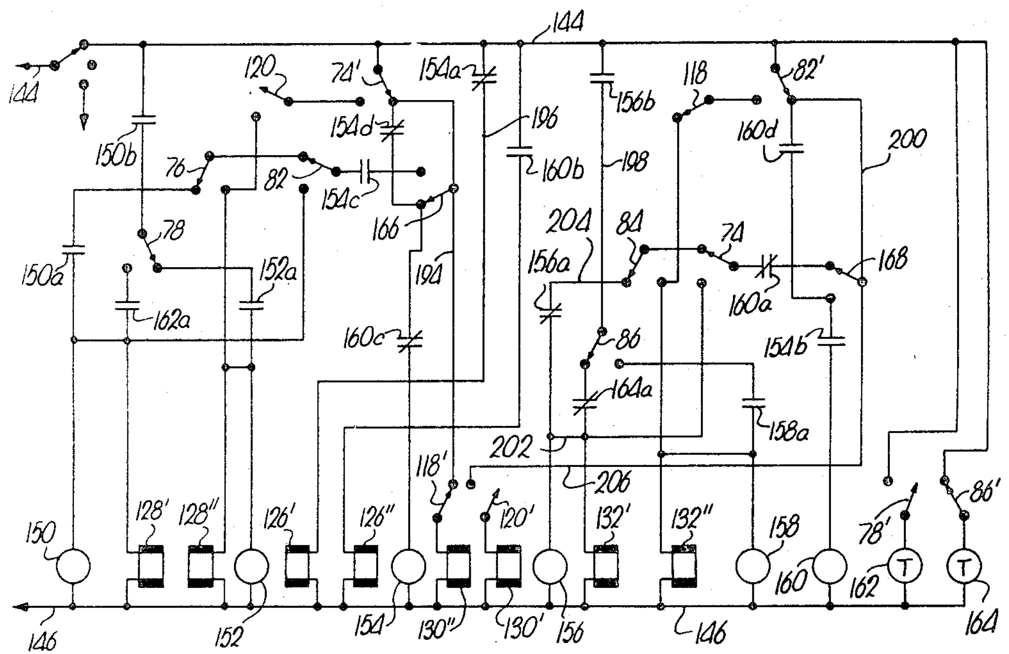
FIG. 7 is an electrical schematic diagram identical to FIG. 6 except that the components thereof are shown in energized and activated states corresponding to extrusion by one ram and advancement of the other ram toward the extrusion head during loading by the other ram.

With reference to FIG. 7, it may be seen that the following electrical is circuit is actuating valve 130 to drive ram 28 towards the extrusion head 22: From line 144 to limit switch 74′, along conductor 194 to limit switch 118′, and hence through solenoid 130″ to line 146. It may thus be appreciated that the engagement of crank arm 112 with limit switch 118–118′ closes an electrical circuit through solenoid 130″ to effect forward driving of ram 28.

Valve 88 is maintained in the FIG. 5 position by the following electrical circuit: From line 144 to relay switch **154*a*, along conductor 196 to solenoid 126′, and hence through the solenoid to line 146. It may be noted that relay switch 154*a* is normally open but is now closed due to the energization of the associated relay coil 154. The energizing circuit for coil 154 is traced as follows: From line 144 to limit switch 74′, through relay switch 154*d* to the lower contact of pressure sensitive switch 166, and hence through relay switch 160*c* and relay coil 154 to line 146. Furthermore, a circuit in shunt with relay switch 154*d* exists from limit switch 74′ through the now actuated pressure sensitive switch 166**.

It should be understood, and will become clear in the paragraphs to follow, that the actuation of pressure sensitive switch 166 initially energized coil 154, the set of contacts **154*d* serving as a holding circuit to maintain coil 154 energized even though pressure sensitive switch 166 should become inactivated for any reason, such as an air bubble or slight void in the dough pack which would effect a loss of pressure. Thus, completion of the extruding phase of ram 28** is assured.

Referring now to the operational state of ram 30 as portrayed by FIGS. 5 and 7, it may be seen in FIG. 7 that timer 164 is energized because of the actuation of limit switch 86–86′ by the cam 80 associated with ram 30. FIG. 7 shows the status of timer switch **164*a* after timer 164 has timed out and reveals that switch 164*a* is now closed by the action of timer 164 to momentarily create the following electrical circuit: From line 144 to relay switch 156*b* (initially closed), along lead 199 to the now activated limit switch 86, through timer switch 164*a* and solenoid 132′, and relay coil 156 in parallel therewith, to line 146. Solenoid 132′ is thus energized after timer 146 times out, resulting in actuation of hydraulic valve 132 to move the valve leftwardly as viewed in FIG. 5 to direct fluid flow into the cylinder 54 in the proper direction to effect advancement of ram 30**.

It should be appreciated that limit switch 86 only momentarily supplies current to relay coil 156 and solenoid 132′, since immediately upon energization of coil 156, its contacts **156*a* close and 156*b* open (as shown in FIG. 7). Coil 156 thus latches through its own contacts 156*a* and creates the following holding circuit to maintain solenoid 132′ energized: From the line 146 to solenoid 132′, along lead 202 to relay switch 156*a*, along lead 204 to limit switch 84, limit switch 74 to relay switch 160*a* through pressure sensitive switch 168 and along lead 200 to limit switch 82′, and hence to line 144. Therefore, once cam 80 becomes disengaged with limit switch 86–86′ upon forward movement of ram 30, it may be seen that the return of switch 86 to its normal position has no effect on the operation of solenoid 132′. The return of switch 86′ to the normal position by forward advancement of ram 30 de-energizes timer 164**, thereby resetting the same.

Figure 8:
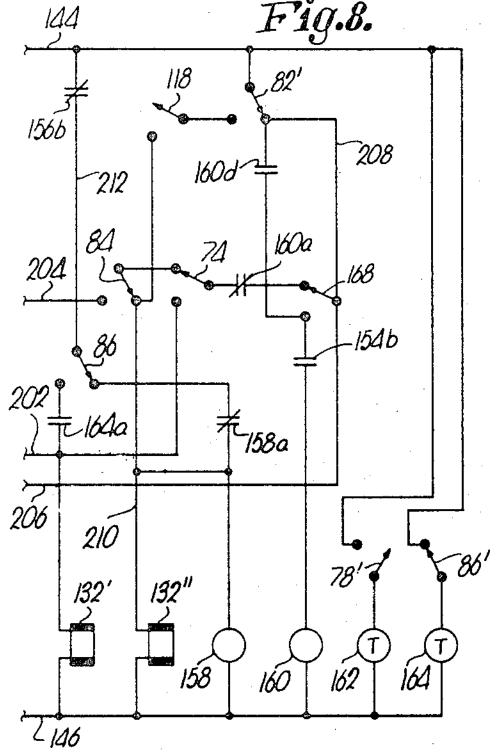
FIG. 8 is a fragmentary, electrical schematic showing one ram extruding while the other ram is retracting during the loading mode.

Ram 30 continues advancement toward head 22 until cam 80 strikes limit switch 84, whereupon ram 30 is then retracted by operation of the control circuitry as depicted in FIG. 8. FIG. 8 is a fragmentary view, the remainder of the circuitry being in the same state as shown in FIG. 7. It may be seen that FIG. 8 is broken away at leads 202, 204 and 206 and at lines 144 and 146 immediately leftwardly of their connections with relay switch **156*b* and solenoid 132′**, respectively.

Engagement of cam 80 with the actuator arm of limit switch 84 establishes the following electrical circuit: From line 144 to limit switch 82′, along lead 208 to pressure sensitive switch 168, through relay switch **160*a*, and limit switch 74 to the now actuated limit switch 84, and hence along lead 210 through solenoid 132″ to line 146. This energizes solenoid 132″ to shift hydraulic valve 132 rightwardly as viewed in FIG. 5 to align the fluid source and reservoir with hydraulic conduits to effect retracting movement of ram 30 away from head 22. Solenoid 132″ is maintained energized after cam 80 leaves limit switch 84 due to a holding circuit that is established while switch 84 is activated. This holding circuit is initiated since solenoid 132″ and relay coil 158 are connected in parallel, such circuit being traced as follows: From line 144 through relay switch 156*b* along lead 212 to limit switch 86, and hence through the now closed contacts 156*a* to relay coil 158 and line 146**.

Figure 9:
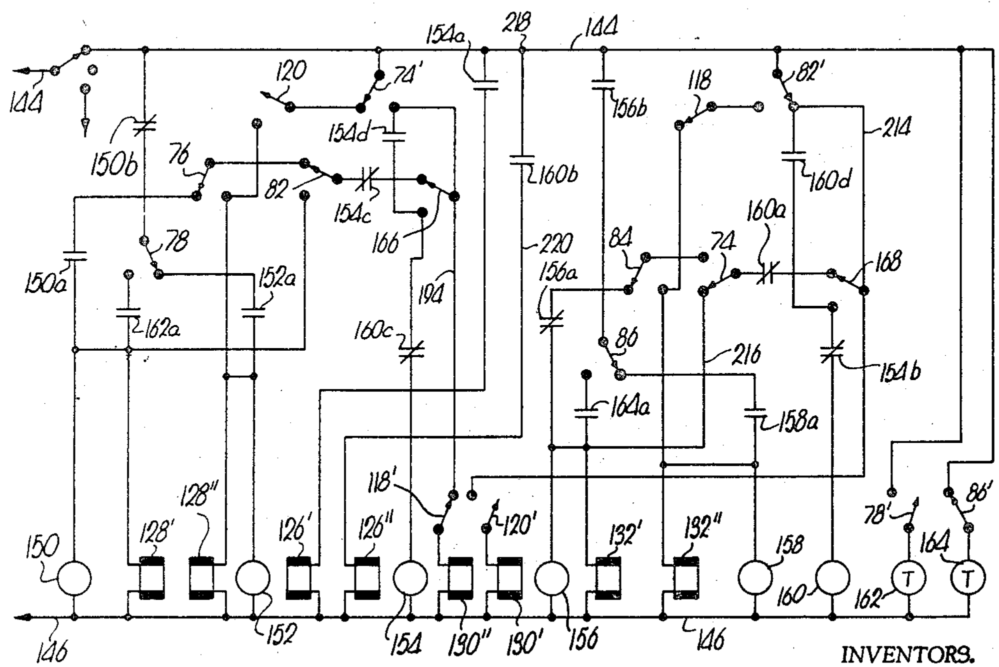
FIG. 9 is an electrical schematic showing completion of the extrusion cycle by one ram and advancement of the other ram toward the dough pack subsequent to its loading cycle.

Ram 30 will continue to advance and retract across the inlet port 46 of tube 26 to progressively load material into tube 26 in the manner as described above until ram 28 finishes its extrusion phase. At such finish, cam 72 associated with ram 28, strikes limit switch 74–74′ and the condition of the control circuitry is then altered to that as shown in FIG. 9. It may be seen that activation of limit switch 74′ breaks the power circuit previously existing through switch 74′ and conductor 194 to solenoid 130″. Therefore, ram 28 is halted as it approaches the inlet 96 of head 22.

Simultaneously, actuation of limit switch 74 establishes the following electrical circuit shown in FIG. 9: From line 144 to limit switch 82′, along lead 214 to pressure sensitive switch 168, through relay switch **160*a* to the now activated limit switch 74, and along lead 216 through relay coil 156 and solenoid 132′ in parallel therewith to line 146. Energization of solenoid 132′ causes ram 30 to immediately commence advancement toward head 22 regardless of its existing position. Furthermore, ram 30 will continue to advance toward the extrusion head even though cam 80 strikes limit switch 84 because the circuit through the now activated limit switch 74 effectively by-passes limit switch 84 and negative its control function. Ram 30 is thus advanced forwardly into the dough batch to pack the batch into a composite mass against valve 88**.

Once ram 30 encounters a predetermined amount of resistance, pressure in hydraulic lines 140 will rise and actuate pressure sensitive switch 168. In FIG. 9 it may be seen that actuation of switch 168 will break the power circuit through solenoid 132′ and stop the advancement of ram 30. Furthermore, actuation of switch 168 establishes the following electrical circuit which effects rotation of valve 88: From line 144 to limit switch 82′, along lead 214 to the now activated pressure sensitive switch 168, and through relay switch **154*b* to relay coil 160 and line 146. Energization of relay coil 160 reverses the positions of its associated switches from that as shown in FIG. 9 to create the following circuit of interest: along line 144 to junction point 218 through now closed relay switch 160*b* and along lead 220 to solenoid 126″, and hence to line 146. Energization of solenoid 126″** actuates piston and cylinder assembly 114 to rotate the valve into alignment with tube 26.

Figure 10:
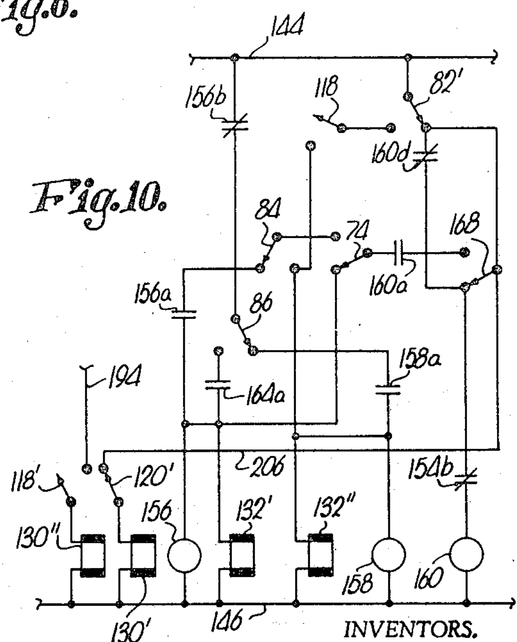
FIG. 10 is a fragmentary electrical schematic showing the previously extruding ram now retracting from the extrusion head while the other ram is commencing extrusion.

When valve 88 moves into alignment with tube 26, crank arm 112 engages limit switch 120–120′ and the status of a portion of the circuitry of interest is then as shown in the fragmentary schematic of FIG. 10. It may be seen in FIG. 10 that limit switch 120′ has created the following circuit: From line 146 to solenoid 130′, through switch 120′ along lead 206 to limit switch 82′, and hence to line 144. Energization of solenoid 130′ aligns the hydraulic conduits of valve 130 in a manner to effect driving of ram 30 toward the head to extrude the packed dough.

Simultaneously with the commencement of the extrusion phase of ram 30, limit switch 120 effects retracting movement of ram 28 so that the same may commence its loading phase. This action may be seen by viewing FIG. 6, wherein it is apparent that closure of switch 120 will energize solenoid 128″ since limit switch 74 is initially in its activated position with cam 72 resting against its actuator arm. Furthermore, since solenoid 128″ and relay coil 152 are connected in parallel, coil 152 will also become energized and create a holding circuit through its own contacts 152*a* to maintain solenoid 128″ energized after cam 72 moves off of the actuator arm of limit switch 74′ and returns this switch to its inactivated position.

The operation of the control circuitry in effecting reciprocating movement of ram 28 through the use of hydraulic valve 128 is similar to that as described above for ram 30 and, therefore, will not be repeated herein. It should be understood that the left and right-hand portions of the schematic drawings of FIGS. 6, 7 and 9 are essentially identical; therefore, those skilled in the art may readily trace the operation of the circuitry in reciprocating ram 28 by reference to the above description for ram 30. Accordingly, the operation of the circuitry during the extrusion phase is correspondingly similar to the operation as above described for ram 28.

With reference now to FIG. 11, a brief discussion is in order regarding the control of the flow of dough into the inlet ports 44 and 46. Attention is directed to FIG. 5 where it may be seen that the pin 122 on crank arm 112 strikes the actuator arm of limit switch 124 midway during rotation of the valve as discussed above. This momentary actuation and release of switch 124 momentarily energizes stepper relay 178 to rotate element 180.

More specifically, it may be seen in FIG. 11 that the state of the circuitry is shown with solenoid 176 energized. However, the next time switch 124 is momentarily closed, element 180 will no longer provide electrical continuity between contacts 186 and 182 but will move to a new position electrically interconnecting contacts 188 and 184. This latter connection energizes solenoid 174 and shifts chute 172 to the left-hand position in alignment with inlet port 44. In this manner, the chute is caused to oscillate back and forth during rotation of valve 88 so that the dough will flow into the tube corresponding to the piston under reciprocation.

It should be understood that the hydraulic system set forth in FIG. 5 is advantageously provided with both a low and a high pressure fluid source. The low pressure source is supplied to the traverse valves 128 and 132 and may also be employed in the operation of valve 126. Valves 128 and 132 and their associated hydraulic circuitry should be constructed and arranged to provide relatively high speed reciprocation of the piston.

The high pressure source is connected to feed valve 130 so that, when this valve is actuated to apply fluid pressure to one of the cylinders 52 or 54, the ram will be driven forwardly under considerable power to effect the extrusion of the dough. Valve 130 and its associated hydraulic circuitry should be arranged so that high power, but relatively low speed, will be applied to the driven ram, moving the latter at a fixed rate of speed regardless of the consistency of the dough. Attention is directed to the fact that the packing phase of each ram subsequent to loading of its associated tube will thus be effected by the higher speed, lower power, hydraulic system, the higher power level being employed only during the extrusion phase.

Having thus described the invention, what is claimed as new and desired to be secured by Letters Patent is:

1. In an extruder:

an extrusion head having a hollow body;

a tube having one end thereof registering with said body and provided with a material inlet port spaced from the body;

a normally closed valve disposed to block passage of material from the tube into the body;

a ram reciprocable in the tube toward and away from said body;

a prime mover connected with the ram for actuating the latter; and structure coupled with the prime mover for controlling the latter to first repeatedly reciprocate the ram across said port and thereby progressively load the tube with material between said port and said body and to thereupon, after a predetermined period of loading time, drive the ram continuously toward said body and thereby transfer the material from the tube into the body upon opening of the valve.

2. The invention of claim 1, said structure having mechanism operable subsequent to loading of the tube and prior to continuous driving of the ram for effecting advancement of the ram toward the body to pack the material against the valve.

3. In an extruder:

an extrusion head having a hollow, material-receiving body provided with a material inlet;

a valve normally closing said inlet; and a material feeder for the head including:

a tube registering with said inlet and provided with a material-receiving port spaced from the head;

a ram reciprocable in the tube toward and away from said inlet;

a prime mover connected with the ram for actuating the latter;

control means coupled with the prime mover for repeatedly reciprocating the ram across said port to progressively load the tube with material between said port and said inlet, said control means having structure operable after a predetermined period of loading for driving the ram continuously toward said inlet, whereby to move the material in the tube toward the inlet; and means connected with the valve for actuating the latter to open the inlet subsequent to loading of the tube and prior to continuous driving of the ram.

4. In an extruder:

an extrusion head having a hollow body;

a tube having one end thereof registering with the body;

a ram reciprocable in the tube between said one end of the latter and the opposite end thereof, said tube having a material inlet disposed between said ends whereby, upon reciprocation of the ram across the inlet, material entering the latter will be progressively loaded in the tube between the inlet and the body;

a normally closed valve disposed to block passage of the material from the tube into the body during loading;

structure operably coupled with the ram for controlling the latter to drive the same toward the body after loading of the tube with material, whereby to pack the latter against the valve;

apparatus coupled with the valve for opening the latter after said packing of the material whereby, upon continuation of said driving of the ram toward the body, the material is transferred from the tube into the body; and means responsive to a predetermined position of the ram in proximity to the body for discontinuing its continuous movement toward the body and effecting a successive cycle of reciprocating movement.

5. The invention of claim 4, and means increasing the force exerted on the material during transfer to a higher level than the force exerted thereon during packing.

6. The invention of claim 4, and means responsive to opening of the valve for increasing the force exerted on the material during transfer to a higher level than the force exerted thereon during packing.

7. In an extruder:

an extrusion head having an hollow body;

a tube having one end thereof registering with the body;

a ram reciprocable in the tube between said one end of the latter and the opposite end thereof, said tube having a material inlet disposed between said ends whereby, upon reciprocation of the ram across the inlet, material entering the latter will be progressively loaded in the tube between the inlet and the body;

a normally closed valve disposed to block passage of the material from the tube into the body during loading;

structure operably coupled with the ram for controlling the latter to repeatedly reciprocate the ram across the inlet to effect said progressive loading of the tube with material, and to drive the ram toward the body after loading of the tube with material, whereby to pack the latter against the valve; and apparatus coupled with the valve and responsive to a predetermined level of pressure in the packed material for opening the valve whereby, upon continuation of said driving of the ram toward the body, the material is transferred from the tube into the body.

8. In an extruder:

an extrusion head having a hollow body;

a pair of tubes each having one end thereof registering with the body;

a ram reciprocable in each tube respectively between said one end of the latter and the opposite end thereof, each tube having a material inlet disposed between said ends whereby, upon reciprocation of the rams across the inlets, material entering the latter will be progressively loaded in the tubes between the inlets and the body;

a valve movable selectively to a closed position with respect to one tube, blocking passage of the material from the one tube into the body during loading of the one tube, and an open position with respect to the other tube to permit passage of loaded material in the other tube from the latter into the body;

means coupled with the valve for opening the latter with respect to the one tube and thereby close the same with respect to the other tube after loading of the one tube with material; and structure operably coupled with the rams for controlling the latter to repeatedly reciprocate one of the rams when its corresponding tube is closed by the valve and simultaneously drive the other ram toward the body, whereby material is transferred to the body alternately from the tubes, and whereby each ram reciprocates to load its tube while the other ram transfers loaded material into the body.

9. The invention of claim 8, said structure being responsive to a predetermined position of the driven ram in proximity to the body for discontinuing its movement toward the body and alternating the operation of the rams.

10. The invention of claim 8, said structure having mechanism operable subsequent to loading of each tube and prior to transfer of the loaded material into the body for advancing the ram of the loaded tube toward the body to pack the material against the valve, said means opening the valve with respect to the loaded tube after said packing of the material against the valve.

11. The invention of claim 10, said means being responsive to a predetermined level of pressure in the packed material for opening the valve with respect to the loaded tube.

12. The invention of claim 10, and means increasing the force exerted on the material during transfer to a higher level than the force exerted thereon during packing.

13. The invention of claim 10, and means responsive to opening of the valve with respect to the loaded tube for increasing the force exerted on the material during transfer to a higher level than the force exerted thereon during packing.

14. In an extruder:

an extrusion head having a hollow, material-receiving body provided with a pair of material inlets;

first and second tubes each registering with a corresponding inlet and having a material-receiving port therein spaced from the corresponding inlet;

a first ram in said first tube for movement longitudinally thereof;

a second ram in said second tube for movement longitudinally thereof;

valve means in the body closing the inlet associated with said first tube and movable out of closing relationship therewith to a disposition in closing relationship with the inlet associated with said second tube;

means operably coupled with said first ram for reciprocating the latter, said reciprocating means including control means maintaining the path of travel of the first ram between a first position where the port of the first tube is between the first ram and the body and a second position where the ram is between the port and the body;

means operably coupled with said second ram for driving the same toward the body to a location adjacent the corresponding inlet, whereby material in the second tube is forced into the body while a quantity of material is loaded in the first tube;

means responsive to arrival of said second ram at said location and coupled with said control means for rendering the latter inoperative to permit said reciprocating means to move said first ram toward the body past said second position, whereby to pack the loaded material against the valve means;

means responsive to a predetermined level of pressure in the packed material in said first tube for rendering said reciprocating means inoperative to halt the first ram and for shifting said valve means to said disposition thereof; and means responsive to arrival of said valve means at said disposition thereof and operably coupled with said first ram for driving the latter toward the body, whereby the packed material in the first tube is forced into the head.

15. The invention of claim 14, wherein said control means halts said first ram at said first position for a predetermined period of time to thereby allow ingress of a predetermined amount of material into the port of the first tube each time the first ram is reciprocated.

16. The invention of claim 15, wherein said control means includes a manually adjustable timer for varying said period.

17. The invention of claim 14, wherein is provided means responsive to arrival of said valve means at said disposition thereof and operably coupled with said second ram for retracting the latter to a position where the port of said second tube is between the body and the second ram.

18. The invention of claim 17, wherein said retracting means reciprocates the second ram between said position thereof and another position where the second ram is between the port of the second tube and the body, whereby a quantity of material is loaded in the second tube while material in the first tube is forced into the body.

19. In an extruder:

an extrusion head having a hollow, generally cylindrical, material-receiving body provided with two inlets in the side of the body and an outlet in the base thereof;

a feeder registered with each of said inlets respectively for advancing material to be extruded toward the body and through the respective inlet;

a valve including a generally cylindrical housing having an entrance in the side of the housing and an exit in the base thereof aligned with said outlet, said valve disposed in the body for movement between a first position for directing material through said outlet from one of said inlets and a second position for directing material through said outlet from the other inlet;

said housing having an elbow therein extending from said entrance to said exit and being rotatable about its axis to register said entrance with said one inlet when the valve is in said first position and to register said entrance with said other inlet when the valve is in said second position; and means operably coupled with said valve and each of said feeders for alternately operating said feeders and for shifting said valve to the position corresponding to the feeder under operation, whereby to provide continuous flow of said material through the outlet.

20. The invention of claim 19, wherein said elbow comprises a longitudinally curved, tubular member whose longitudinal axis undergoes a 90° curve between said entrance and said exit.

References Cited

UNITED STATES PATENTS

| | | | |
|---|---|---|---|
| 2,366,417 | 1/1945 | MacMillan. | |
| 2,537,920 | 1/1951 | Smith | 25—12 |
| 2,643,620 | 6/1953 | Miller | 107—14 |
| 2,705,916 | 4/1955 | Millgard. | |
| 2,748,933 | 6/1956 | Dutsch. | |
| 2,783,499 | 3/1957 | Billen | 25—15 X |

BILLY J. WILHITE, *Primary Examiner.*